(12) United States Patent
Robinson et al.

(10) Patent No.: US 7,735,081 B2
(45) Date of Patent: Jun. 8, 2010

(54) METHOD, APPARATUS AND SYSTEM FOR TRANSPARENT UNIFICATION OF VIRTUAL MACHINES

(75) Inventors: Scott H. Robinson, Portland, OR (US); Vijay Tewari, Portland, OR (US); Robert C. Knauerhase, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 1572 days.

(21) Appl. No.: 11/016,656

(22) Filed: Dec. 17, 2004

(65) Prior Publication Data

US 2006/0136912 A1   Jun. 22, 2006

(51) Int. Cl.
*G06F 9/455* (2006.01)
*G06F 3/00* (2006.01)
(52) U.S. Cl. ......................................... 718/1; 715/700
(58) Field of Classification Search .................. 715/700
See application file for complete search history.

(56) References Cited

U.S. PATENT DOCUMENTS

| | | | |
|---|---|---|---|
| 6,112,279 A | 8/2000 | Wang | |
| 6,351,808 B1 | 2/2002 | Joy et al. | |
| 6,496,847 B1 | 12/2002 | Bugnion et al. | |
| 6,510,448 B1 | 1/2003 | Churchyard | |
| 6,567,839 B1 | 5/2003 | Borkenhagen et al. | |
| 6,609,126 B1 | 8/2003 | Smith et al. | |
| 6,996,829 B2 | 2/2006 | Meyer | |
| 7,069,413 B1 | 6/2006 | Agesen et al. | |
| 2002/0173863 A1* | 11/2002 | Imada et al. ................... | 700/83 |
| 2004/0010788 A1 | 1/2004 | Cota-Robles et al. | |
| 2005/0132367 A1 | 6/2005 | Tewari et al. | |
| 2005/0198303 A1 | 9/2005 | Knauerhase et al. | |
| 2006/0136911 A1 | 6/2006 | Robinson et al. | |

(Continued)

OTHER PUBLICATIONS

"Intel Patent Reveals Virtual Machine Geared for Consumer Desktops", Macsimum News, Jun. 22, 2006, Internet document at: http://www.macsimumnews.com/index.php/archive/intel_patent_reveals_virtual_machine_geared_for_consumer_desktops/, (5 pages).

(Continued)

*Primary Examiner*—Meng-Ai An
*Assistant Examiner*—Mengyao Zhe
(74) *Attorney, Agent, or Firm*—Blakely, Sokoloff, Taylor & Zafman LLP

(57) ABSTRACT

A method, apparatus and system for transparently unifying virtual machines ("VMs") is disclosed. An embodiment of the present invention enables a user to interact with various applications on a VM host while unaware of the VM structure on the VM host. The user may be presented with a unified desktop interface representing a composite and/or unified view of the VM host. Via this unified desktop interface, the user may perform all necessary commands and/or receive output. Invisible to the user, the unified desktop interface represents a unification console. The unification console may be an independent component (e.g., an enhanced VM) and/or a subset of a virtual machine manager ("VMM") component on the VM host. In either situation, the unification console may, alone and/or in conjunction with the VMM, route and/or redirect and/or transform and/or filter the user's commands to the appropriate applications and redirect and/or copy and/or transform and/or filter the output from the applications to be displayed in the unified desktop interface.

23 Claims, 5 Drawing Sheets

U.S. PATENT DOCUMENTS

2006/0136912 A1    6/2006    Robinson et al.
2006/0143617 A1    6/2006    Knauerhase et al.
2007/0038987 A1    2/2007    Ohara et al.

OTHER PUBLICATIONS

Barrett, Rob, et al., "Intermediaries: New Places for Producing and Manipulating Web Content", Computer Networks and ISDN Systems, vol. 30, No. 1-7, Apr. 1998, XP004121397; ISSN: 0169-7552, (pp. 509-518).

Cook, Brad, "Intel Patent Application Sheds Light on Virtualization", the Mac Observer, Jun. 22, 2006, Internet document at: http://www.macobserver.com/article/2006/06/22.16.shtml, (3 pages).

Reasoner, Shelly R., "Management by Proxy Agent", 8080 Wescon Conference Record, Wescon Technical Papers, Western Periodicals Co., USA, vol. 35, Nov. 1, 1991; XP000320534, (pp. 190-195).

Short, Rob, et al., "Windows NT Clusters for Availability and Scalability", Compcon '97. Proceedings, IEEE San Jose, CA, USA, Feb. 23-26, 1997, IEEE Comput. Soc., XP010219504, ISBN: 0-8186-7804-6, (pp. 8-13).

Silberschatz, Avi, et al., "Applied Operating System Concepts", First Edition, 2000, John Wiley & Sons, Inc., (pp. 87-113).

* cited by examiner

METHOD, APPARATUS AND SYSTEM FOR TRANSPARENT UNIFICATION OF VIRTUAL MACHINES

BACKGROUND

Virtualization technology enables a single host computer running a virtual machine monitor ("VMM") to present multiple abstractions and/or views of the host, such that the underlying hardware of the host appears as one or more independently operating virtual machines ("VMs"). Each VM may function as a self-contained platform, running its own operating system ("OS") and/or a software application(s). The VMM manages allocation and virtualization of host resources, and performs context switching as necessary to cycle between various virtual machines according to a round-robin or other scheduling algorithms.

Given the complexity and processing requirements of virtualization, this technology has typically been available only on workstations, servers and/or mainframes for use by sophisticated users. As processor technology advances, however, virtualization is being made available in the desktop environment for use by average users.

BRIEF DESCRIPTION OF THE DRAWINGS

The present invention is illustrated by way of example and not limitation in the figures of the accompanying drawings in which like references indicate similar elements, and in which.

DETAILED DESCRIPTION

Embodiments of the present invention provide a method, apparatus and system for transparently unifying multiple virtual machines ("VMs") on a host. More specifically, a unification console on a host may be dedicated to providing a user with a unified view of the multiple VMs on the host, regardless of the application the user is running and/or the VM in which the application is running. In one embodiment the unification console could itself be a VM. Reference in the specification to "one embodiment" or "an embodiment" of the present invention means that a particular feature, structure or characteristic described in connection with the embodiment is included in at least one embodiment of the present invention. Thus, the appearances of the phrases "in one embodiment," "according to one embodiment" or the like appearing in various places throughout the specification are not necessarily all referring to the same embodiment.

As previously described, virtualization is becoming more commonly available in the desktop environment. In this environment, the most likely users are unlikely to be computer professionals (e.g., information technology specialists in corporate environments) but rather less sophisticated users (e.g., home personal computer ("PC") users and/or non-technical, less sophisticated corporate users). The applications that run within the desktop environment and the types of uses for the applications may also differ from corporate applications. For example, one use of virtualization in a home (and the associated advantage of running one or more independent VMs on a host) may be for each family member to be allocated a VM partition with their own customized environment, e.g., a gaming VM partition, a Personal Video Recorder ("PVR") appliance VM, an enterprise Information Technology ("IT") supplied VM for telecommuting, etc. Moreover, it is likely that each user may have several VMs, each possibly dedicated for a specific task such as a dedicated VM for internet browsing, one for gaming applications, etc. Some might be scheduled to run 24×7 (e.g. a personal video recorder ("PVR")), while others are launched and exited frequently. In this environment, the average home PC user may be overwhelmed by the task of understanding and/or managing the VM partitions (e.g., moving files, setting up access permissions, etc.).

Figure 1:
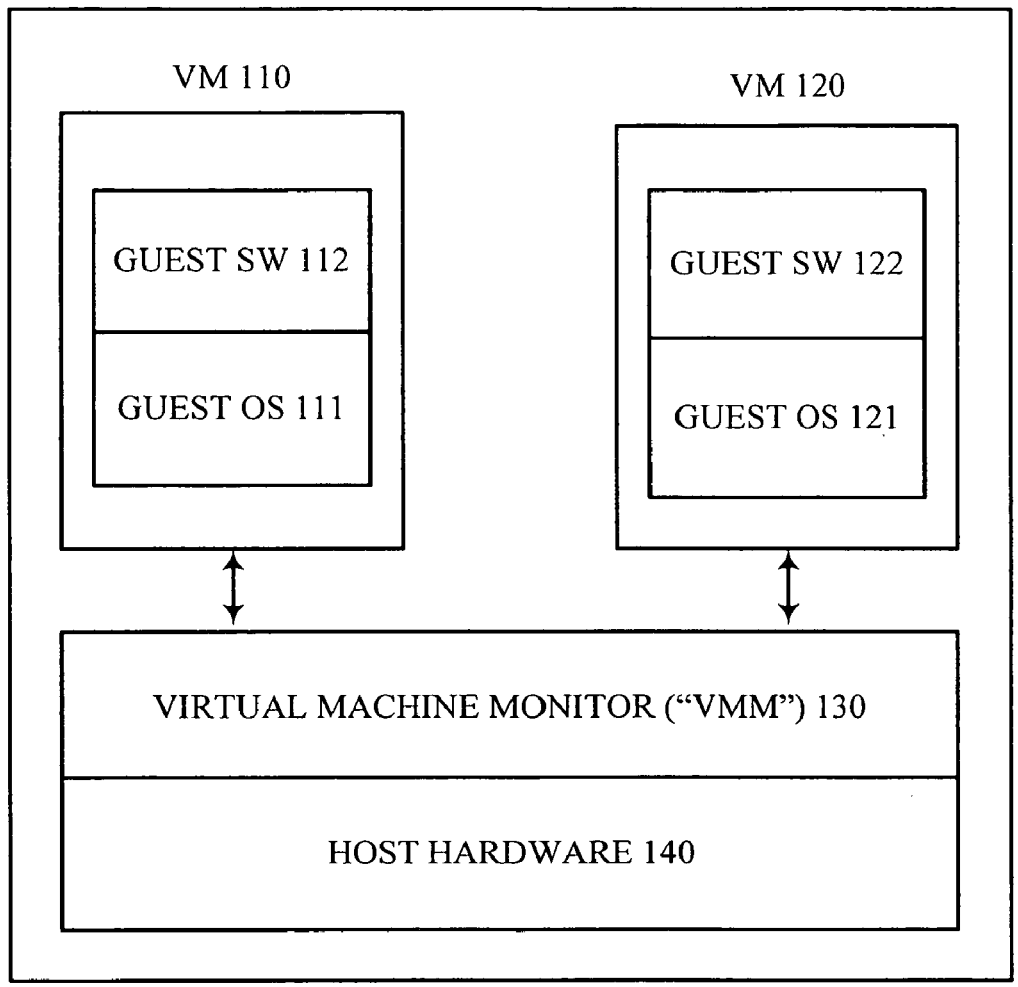
FIG. 1 illustrates an example of a typical VM host.

FIG. 1 illustrates an example of a typical virtual machine host platform ("Host 100"). As previously described, a virtual-machine monitor ("VMM 130") typically runs on the host platform and presents an abstraction(s) and/or view(s) of the platform (also referred to as "virtual machines" or "VMs") to other software. Although only two VM partitions are illustrated ("VM 110" and "VM 120", hereafter referred to collectively as "VMs"), these VMs are merely illustrative and additional virtual machines may be added to the host. VMM 130 may be implemented in software (e.g., as a standalone program and/or a component of a host operating system), hardware, firmware and/or any combination thereof.

VM 110 and VM 120 may function as self-contained platforms respectively, running their own "guest operating systems" (i.e., operating systems hosted by VMM 130, illustrated as "Guest OS 111" and "Guest OS 121" and hereafter referred to collectively as "Guest OS") and other software (illustrated as "Guest Software 112" and "Guest Software 122" and hereafter referred to collectively as "Guest Software"). Each Guest OS and/or Guest Software operates as if it were running on a dedicated computer. That is, each Guest OS and/or Guest Software may expect to control various events and have access to hardware resources on Host 100. The VMM need not just project a representation of the physical platform or give direct access to resources. The VMM may also create new virtual devices (e.g. a network interface card ("NIC")) while possibly using Host 100's processor and similar devices (e.g., another NIC) on Host 100 to emulate those virtual devices. The virtual platform presented to a given VM by VMM 130 may be a hybrid of virtual and physical elements. Therefore, within each VM, the Guest OS and/or Guest Software may behave as if they were, in effect, running on the virtual platform hardware, supported by the VMM 130. In reality however, VMM 130 has ultimate control over the events and hardware resources (which may be physical or virtual as created by VMM 130), and allocates resources to the VMs according to its own policies. Recursive or layered VM schemes may also be possible, e.g., VM 110 may host another virtual host (which may appear to have behaviors like physical Host 100 or some other virtual host platform, or a hybrid platform.) These types of recursive schemes are well known to those of ordinary skill in the art and further description thereof is omitted herein in order not to unnecessarily obscure embodiments of the present invention.

In order to access applications running on the various VMs on a VM host, a user typically has to know which VM the application is running in and manually switch to the appropriate VM. Thus, for example, if the user desires to play a video game (e.g., Guest Software 112 running on VM 110), the user has to manually select VM 110, find the application and launch the game. Thereafter, if the user desires to access another application (e.g., Guest Software 122 running on VM 120), the user has to determine which VM the application is running in and manually switch to that VM in order to run the application. Although switching between VMs may not be especially cumbersome (e.g., a keystroke to switch from one VM to another), keeping track of what applications are running on each VM may prove to be difficult, especially if the host is configured to run more than two VMs (as is likely). For a home PC user, keeping track of the various partitions that are running on his or her PC and/or the applications running in each partition may prove to be highly complex. The typical home PC user may not be technically savvy enough to understand the underlying view of the VM host and as a result, may have difficulties and/or shy away from fully utilizing a host running multiple VMs.

Figure 2:
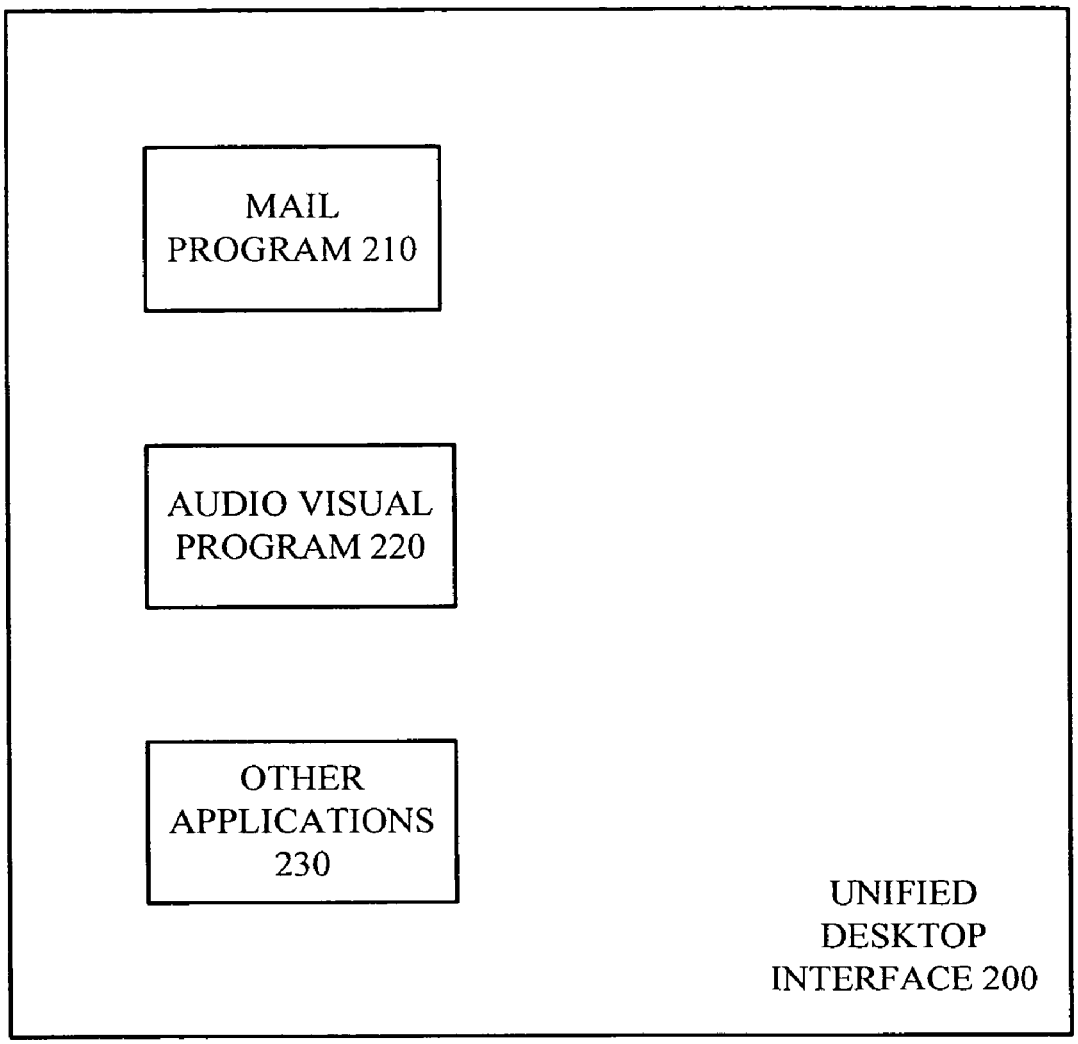
FIG. 2 illustrates an example of a unified user interface on the desktop of the VM host according to an embodiment of the present invention.

Embodiments of the present invention provide a method, apparatus and system for transparently unifying multiple VMs on a host. More specifically, according to an embodiment of the present invention, users may interact with Guest Software on a VM host via a unified graphical user interface (the user interface hereafter referred to as "Unified Desktop Interface 200"). As illustrated in FIG. 2, the user may be presented with Unified Desktop Interface 200, which is a logical representation of the views of all or a subset of the various VMs on Host 100 such that the user can see and/or launch applications in one or more VMs from this view. In various embodiments, the view presented to the user may resemble a typical desktop, but unknown to the user, the desktop may in fact represent applications contained in various VMs on the host. In one embodiment, the user's view of Unified Desktop Interface 200 may include all applications available to the user. Thus, for example, if the user has access to all the VMs on Host 100, then the various applications in each partition may be visible and accessible to the user in Unified Desktop Interface 200. Alternatively, the user may only have permission to access a subset of VMs on the host, in which case the applications visible and accessible to the user may include only those contained in the authorized VMs. As illustrated, Mail Program 210, Audio Visual Program 220 and various other applications (shown collectively as "Other Applications 230") are presented to the user in this interface without any indication of which VM these applications reside in. In fact, from the user's perspective, there may appear to be little to no difference between a non-virtualized environment and the virtualized environment of Host 100 (in which each application is contained in its own VM).

Unified Desktop Interface 200 illustrated in FIG. 2 is merely an example of an interface that the user may see, in which there is no indication that the host is virtualized. In an alternate embodiment, Unified Desktop Interface 200 may include a view of all the VMs as well as all the applications running in each VM. In yet another embodiment, in a layered VM environment, a unified desktop interface may exist across all VM layers. Alternatively, in a layered VM environment, a unified desktop interface may be provided with each VMM, thus enabling one unified desktop interface to be embedded in the unified desktop environment of a parent VM layer.

Figure 3:
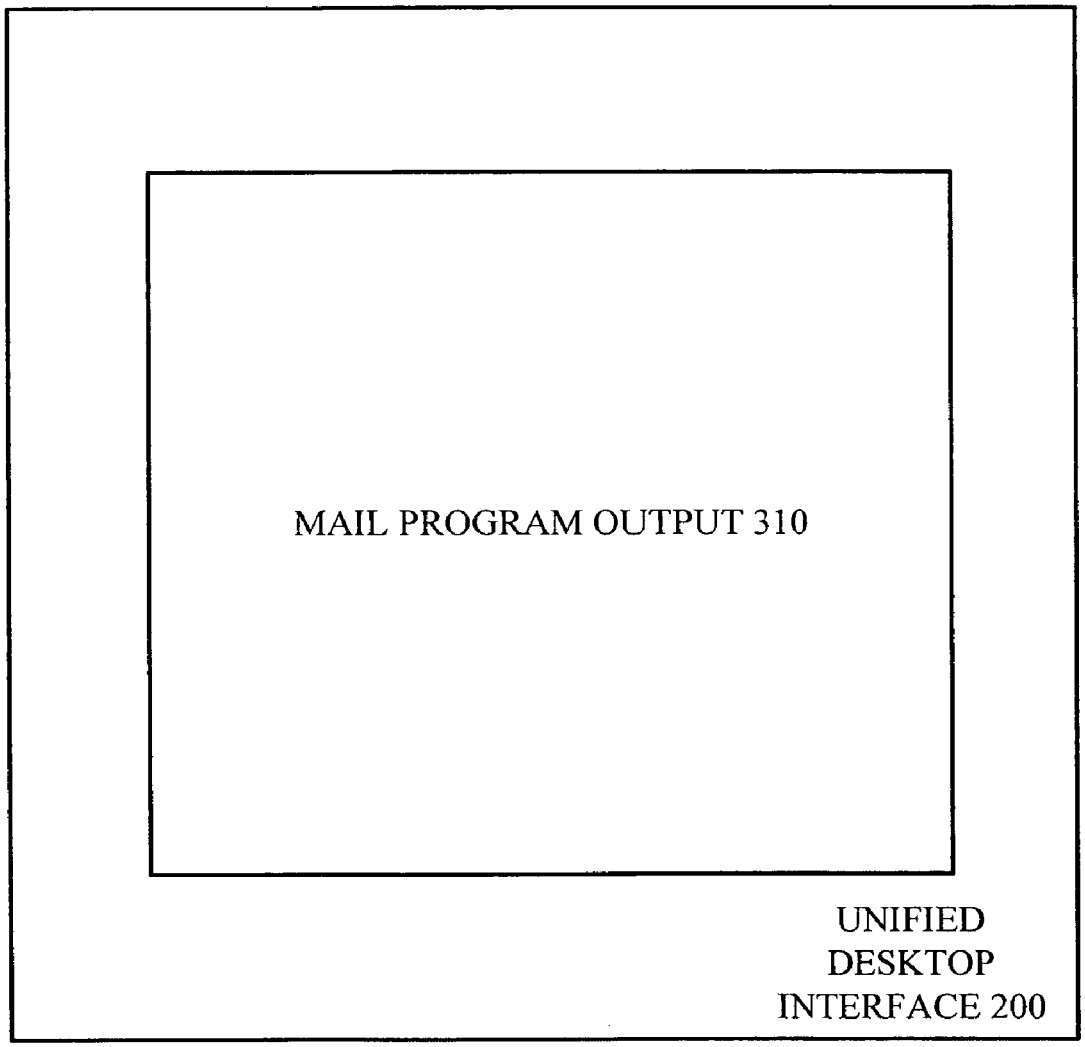
FIG. 3 illustrates the output from an application running in a VM, as displayed on the unified user interface on the desktop on the VM host according to an embodiment of the present invention.

Various other unified desktop interfaces may be implemented without departing from the spirit of embodiments of the present invention. Most importantly, by presenting a unified view to the user, embodiments of the present invention significantly improve the usability of multiple VMs simultaneously, because the user's experience may resemble that of a typical desktop PC user, namely one in which the user simply selects an application (i.e., Guest Software) on Host 100 to execute, without needing to be aware of the virtual partitions on the PC and/or how to manage or exchange the Guest Software files within these partitions. Thus, for example, if the user selects Mail Program 210, as expected, the user may then be presented with the graphical output ("Mail Program Output 310") from Mail Program 210, as illustrated in FIG. 3. The user may view this output within Unified Desktop Interface 200 and the underlying interaction with the various VMs on Host 100 may remain invisible to the user, i.e., the user does not know that Mail Program 210 is actually executing in one of the VMs on Host 100.

Although invisible to the user, various elements on Host 100 enable the user to view and/or interact with all the VMs on Host 100 via Unified Desktop Interface 200. More specifically, in various embodiments of the present invention, a "unification console" (described in further detail below) enables the unified interface by transparently redirecting the input and/or output from the user and the VMs such that the user does not have to know which VM an application resides in and/or is running in. For the purposes of this specification, input and/or output shall include any form of input and/or output that Host 100 may recognize. Thus, although "input" hereafter implies that it is a keystroke, a mouse click or mouse movement provided by the user, it may in fact include any other input scheme that Host 100 is capable of receiving. Similarly, although "output" is described hereafter as primarily being visual output, embodiments of the present invention are not so limited. Output may therefore other types of output such as audio output.

Figure 4:
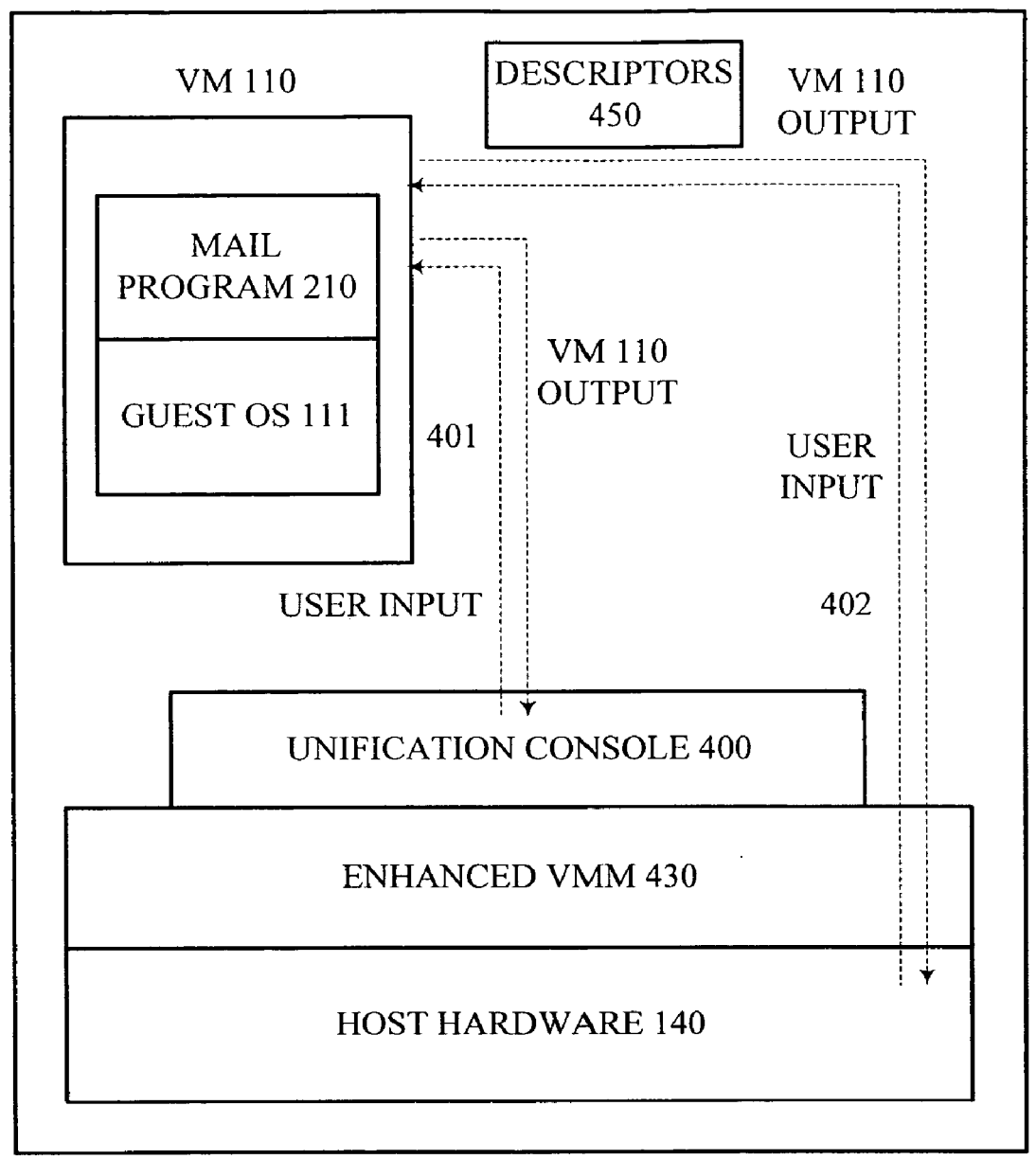
FIG. 4 illustrates a unification console input and output interactions according to an embodiment of the present invention.

In one embodiment, a dedicated VM on Host 100 may be designated to run the unification console with access to all the VMs on Host 100. FIG. 4 illustrates conceptually how the unification console ("Unification Console 400") functions to present Unified Desktop Interface 200 to the user. Although Unification Console 400 is illustrated as a separate component from the VMM ("Enhanced VMM 430"), embodiments of the invention are not so limited. Instead, in one embodiment, Enhanced VMM 430 may include all the functionality of Unification Console 400 while in an alternate embodiment, Unification Console 400 may be a component that works in conjunction with Enhanced VMM 430 (e.g., in an embodiment, Unification Console 400 may comprise an enhanced VM capable of accessing all the other VMs on Host 100). In various embodiments, input and/or output from the user and/ or the VMs (e.g., VM 110 and VM 120) may be received by Enhanced VMM 430 and passed on to Unification Console 400 for processing. Further details of this processing are described below. It will be readily apparent to those of ordinary skill in the art that Unification Console 400 may be implemented in software, hardware, firmware and/or any combination thereof. Additionally, Enhanced VMM 430 may include various enhancements over existing VMMs, either to include the functionality of Unification Console 400 and/or to interact with Unification Console 400. It will be readily apparent to those of ordinary skill in the art that Enhanced VMM 430 may also be implemented in software (e.g., as a standalone program and/or a component of a host operating system), hardware, firmware and/or any combination thereof.

As illustrated in FIG. 4, in one embodiment, when a user selects an application on Host 100 (e.g., Mail Program 210) via the unified interface (e.g., Unified Desktop Interface 200 in FIG. 2), the user selection may be intercepted by Enhanced VMM 430 and passed onto Unification Console 400. Unification Console 400 may then, in conjunction with Enhanced VMM 430, determine how and where to deliver the user selection. Similarly, Unification Console 400 and/or Enhanced VMM 430 may handle the redirection of output (e.g., graphical output) from Mail Program 210 such that the user views the output on the unified interface (e.g., Unified Desktop Interface 200 in FIG. 2). Although FIG. 4 shows only VM 110, VM 120 may also be running on Host 100. Details of VM 120 have not been included herein in order to avoid obscuring how VM 110 functions according to an embodiment of the present invention. It will be readily apparent to those of ordinary skill in the art, however, that VM 120 may function similarly, alone or concurrently with VM 110. Details of how Unification Console 400 performs the routing, redirection and/or delivery of input and/or output for VM 110 is discussed in further detail below.

Unification Console 400 may intercept, route, redirect and/or deliver input/output in various ways without departing from the spirit of embodiments of the present invention. Thus, for example, in one embodiment, information about each user and/or each VM on the host may be stored as "descriptors" (shown collectively as "Descriptors 450"). A descriptor, for the purposes of this specification, shall include a registry or other such listing (e.g. database) which describes various parameters (e.g., associated metadata containing configuration and/or resource information and permission/Access Control List ("ACL") information) for the user (and other users) about the computing environment, such as user identity and permissions, applications, virtual machines, and Unification Console 400's configuration Thus, for example, when a user logs in to Host 100, a default descriptor may be automatically loaded. The default descriptor may, for example, describe the default VMs for the user as well as other management policies and rules (e.g. filters and transformations) for Unification Console 400. In an alternative embodiment, the user may be prompted to select a descriptor from Descriptors 250 or build a new descriptor for use during the user's current session. In one embodiment, Descriptors 250 may be an enhanced startup group, with additional metadata to provide information to Unification Console 400. The concept of startup groups is well known to those of ordinary skill in the art and further description thereof is omitted herein. In one embodiment of the present invention, Descriptors 250 may be provided by an IT organization to all corporate users. Alternatively (or in addition), the user may edit Descriptors 250 at any time, to customize the descriptors for various sessions. Descriptors 250 may be used by Unification Console 400 at startup of Host 100, when the user logs into Host 100 and/or during the user's interaction with various applications on Host 100.

Descriptors 250 thus provide Unification Console 400 with the information necessary to perform automatic content management on Host 100. Descriptors 250 may, for example, contain information about automation scripts to apply to certain incoming and/or outgoing data. Descriptors 250 may also include information about certain data types, VMs, and/or data sources that should not be filtered, modified, and/or monitored by the Unification Console 400. A set of rules, patterns and/or policies may be defined on Host 10 to dictate how Unification Console 400 may utilize Descriptors 250 (e.g., the order and priority of descriptor evaluation and/or how to resolve conflicts). In one embodiment, various ones of Descriptors 250 may be controlled by users, while others of Descriptors 250 may be controlled by the system (e.g. a "root" or "super user" account). As previously described, Descriptors 250 may be governed through ACLs (permissions) and/or other metadata similar to that for file systems.

Descriptors 250 may be manipulated in various ways, e.g., copied, deleted, enabled, disabled, edited, etc. The effect and scope of a given Descriptor 250 may vary as required. For example, Descriptors 250 may be applicable to individual users, to one or more groups or users or to the entire system, i.e., all VMs and/or users on Host 100. Additionally, Descriptors 250 may comprise a collection of descriptors (i.e., a collection of registries or other such listings), and upon applying the information from a first descriptor, Unification Console 400 may determine that the information from a second descriptor should also be applied. In other words, in one embodiment, upon applying a first descriptor, the conditions on Host 100 may change such that a second descriptor may also be applicable. This process may continue until multiple descriptors are applied, as appropriate. Additionally, in various embodiments, when Unification Console 400 acts based on information in Descriptors 250, it may retain/log various details from the action. For example, when saving a file, Unification Console 400 may update a log file, a database, and/or file metadata with information about the action (e.g. file source, descriptor rules, etc). This type of information may be useful to Unification Console 400 for tuning performance and/or to the user (e.g., if a user is searching for a video file from a specific user, etc.)

Thus, for example, as previously illustrated in FIG. 2, if a user logs into Host 100 and has access to VM 110, the user may see the user-clickable icon representing Mail Program 210 on Unified Desktop Interface 200. In one embodiment, when the user clicks on the icon, as illustrated in FIG. 4, Enhanced VMM 430 may intercept the selection and pass the information on to Unification Console 400. Unification Console 400, in conjunction with Enhanced VMM 430 (e.g., via a communication channel such as a shared memory setup for that purpose set up by Enhanced VMM 430, illustrated conceptually as 401 and 402 and described in further detail below), may determine that VM 110 is already instantiated and thus simply redirect the users input to VM 110. In an alternate embodiment, VM 110 may not be instantiated yet and if so, Unification Console 400 may then, in conjunction with Enhanced VMM, instruct VM 110 to start executing. If VM 110 is already running, Unification Console 400 may examine VM 110 to determine whether Mail Program 210 is already running within the VM. If Mail Program 210 is not running, Unification Console 400, in conjunction with Enhanced VMM 430, may cause Mail Program 210 to launch in VM 110. In either embodiment, the user need not be aware of where Mail Program 210 resides and/or whether the VM is executing. Instead, the user may continue to interact with all the applications on Host 100 that he or she is authorized to use via Unified Desktop Interface 200.

Although the user interacts with Mail Program 210 via the unified interface (e.g., Unified Desktop Interface 200 in FIG. 2), the actual processing for Mail Program 210 is being performed within the context of VM 110. As a result, the output from the application will be displayed within the context of VM 110, i.e., in order to view the output, the user would typically have to switch to VM 110. According to an embodiment of the present invention, however, in order for the user to seamlessly view the output of Mail Program 210 without having to know which VM the program is being processed in, Unification Console 400 may redirect and/or duplicate the output from VM 110 to Unified Desktop Interface 200. Thus, in one embodiment, the user may remain within the context of Unification Console 400 but still view the output of the applications running in other VMs. This further enhances the user's experience by enabling the user to remain oblivious of the virtualized environment on Host 100.

Unification Console 400 may redirect the output from VM 110 to Unified Desktop Interface 200 in various ways. For example, in one embodiment, the user may interact with the VMs on Host 100 only via Unified Desktop Interface 200. In this embodiment, the graphics adapter (included in Host Hardware 140) may be dedicated to Unification Console 400 and all output from any VM on Host 100 (which is typically handled by virtual adapters on Host 100) may be redirected to Unified Desktop Interface 200. In an alternate embodiment, if the user is likely to switch between VMs as well as view output on Unified Desktop Interface 200, the graphics adapter on Host 100 may be virtualized for each VM on Host 100, including for Unification Console 400. In this embodiment, the output from VM 110 may be duplicated for display in Unified Desktop Interface 200, thus enabling the user to view the output in either VM 110's context (e.g., if the user is savvy enough to switch to that context), or within Unified Desktop Interface 200.

Input to and/or output from the VMs may be transformed or filtered by Unification Console 400 (and/or Unified Desktop Interface 200). For example, output such as status or error messages from various applications or VM operations may be monitored by Unification Console 400 in order to take corrective action, but those messages may not be displayed to the user at all or, if displayed, these messages may be shown in a centralized condensed form (e.g. a log file). Additionally, in one embodiment, audio output from VMs without the current user focus may be muted or turned down. Similarly, inputs into the VMs may also be transformed or filtered by Unification Console 400. For example, audio voice data may only be permitted to certain applications and VMs, even if the system microphone is always on. In one embodiment, audio input may be muted to all applications except a child's voice morphing program or to a Voice Over IP (VoIP) Internet telephony VM or application. In yet another embodiment, high-resolution video inputs may have resolution downgraded to accommodate the bandwidth or processing or storage limitations afforded a given VM or application. Such restrictions may be documented in the descriptors 450. The above descriptions of transformation and filtering of various input and outputs are merely exemplary and other such filtering or transformations are possible on both without departing from the spirit of embodiments of the present invention.

Regardless of the embodiment, the user's input and the output from the appropriate VM may be appropriately routed, redirected, transformed or filtered by Unification Console 400. FIG. 4 includes examples (illustrated by arrows 401 and 402) of how the input and/or output from the users and VM 110 may be redirected in various embodiments of the present invention. In one embodiment, since Enhanced VMM 430 is capable of interacting with Unification Console 400 and intercepts input and/or output from the user and VMs on Host 100, Enhanced VMM 430 may handle the routing, redirecting, transforming and/or filtering of the user's input and the VM output. This input and VM 110 output are illustrated in FIG. 4 by arrows 401 and 402. In this embodiment, all input from the user and output from VM 110 are intercepted by Enhanced VMM 430 and routed, redirected, transformed or filtered in various ways (e.g., by intercepting Graphics Display Interface ("GDI") messages from VM 110 to the graphics adapter in Host Hardware 140). In an alternate embodiment, however, the input and/or output may be routed, redirected, transformed or filtered via the network stack (that typically runs in an operating system on Host Hardware 140), via a remote desktop protocol (e.g., Microsoft's Remote Desktop protocol) and then routed back up the network stack to Unified Console 400. This redirection is illustrated in FIG. 4 by arrows 402. The concept of remote graphical desktops using network stacks is well known to those of ordinary skill in the art and further description thereof is omitted herein.

Figure 5:
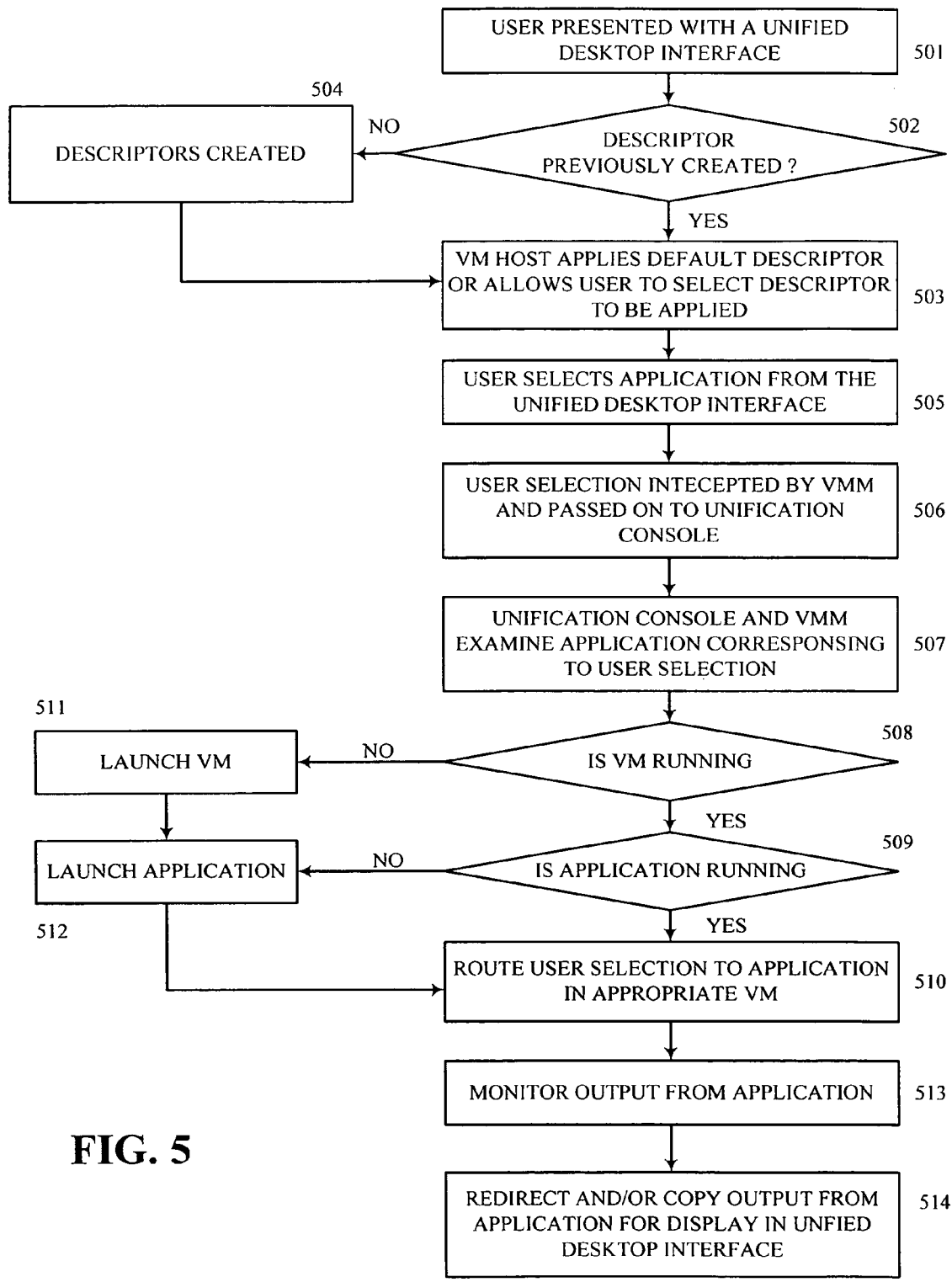
FIG. 5 is a flowchart illustrating an embodiment of the present invention.

FIG. 5 is a flowchart illustrating an embodiment of the present invention. Although the following operations may be described as a sequential process, many of the operations may in fact be performed concurrently. In addition, the order of the operations may be re-arranged without departing from the spirit of embodiments of the invention. In 501, a VM host may startup and present a user with a unified user interface. This VM may host the unified user interface and either includes or is able to communicate with a unification console. During the startup, if a descriptor module exists (e.g., previously created by a user or by the OEM/computer vendor) in 502, then the VM host may automatically apply a default descriptor or allow the user to select a descriptor in 503. Descriptors may be hierarchically organized. The descriptor the user chooses or receives may, therefore, describe the unification console look and feel, its required defaults, as well as contain descriptions (or pointers to descriptors) for various VMs and applications. The process of applying such a descriptor is described in further detail below. If, however, a descriptor module has not yet been defined in 502, the user may have the option in 504 of creating a descriptor and the descriptor may be applied to the VM host in 503. This results in launching zero or more VMs and their applications, as described in subsequent steps, or connecting to already launched, persistent VMs (e.g. a VM one containing a PVR application). In 505, the user may select an application from the unified user interface, and this user-selection may be intercepted by a VMM and passed on to a unification console on the VM host in 506. In 507, the VMM and the unification console may examine the application corresponding to the user selection. The VMM and unification console may first determine whether the VM in which the application resides in running in 508. If the VM is running, the VMM and unification console may then determine whether the application corresponding to the user-selection is running in 509. If the application is running, the VMM and Unification Console may route the user selection to the application in the VM. If, however, in 508, the VM is not running, then in 511, the VMM and unification console may cause the VM to be launched. The VMM and unification console may additionally cause the application to be launched in 512, and the user selection may then be routed (connected) to the application in 510. In one embodiment, instead of launching a VM, a VM may be restored using its hibernation or sleep save image. This restored VM may include applications that are already running. Thereafter, the VMM and unification console may monitor the output from the application in 513, and in 514, redirect and/or copy and/or filter and/or transform output from the application to the unification console, to be presented using the unified desktop interface.

The hosts according to embodiments of the present invention may be implemented on a variety of computing devices. According to an embodiment of the present invention, computing devices may include various components capable of executing instructions to accomplish an embodiment of the present invention. For example, the computing devices may include and/or be coupled to at least one machine-accessible medium. As used in this specification, a "machine" includes, but is not limited to, any computing device with one or more processors. As used in this specification, a machine-accessible medium includes any mechanism that stores information in any form accessible by a computing device, the machine-accessible medium including but not limited to, recordable/non-recordable media (such as read-only memory (ROM), random-access memory (RAM), and/or magnetic disk storage media, optical storage media and flash memory devices).

According to an embodiment, a computing device may include various other well-known components such as one or more processors. Thus, the computing device (e.g., Host 100) may include any type of processor capable of executing software, including microprocessors, multi-threaded processors, multi-core processors, digital signal processors, co-processors, reconfigurable processors, microcontrollers and/or any combination thereof. The processors may be arranged in various configurations such as symmetric multi-processors (e.g., 2-way, 4-way, 8-way, etc.) and/or in other communication topologies (e.g., toroidal meshes), either now known or hereafter developed. The term "processor" may include, but is not necessarily limited to, extensible microcode, macrocode, software, programmable logic, hard coded logic, etc., capable of executing embodiments of the present invention.

The processor(s) and machine-accessible media may be communicatively coupled using a bridge/memory controller, and the processor may be capable of executing instructions stored in the machine-accessible media. The bridge/memory controller may be coupled to a graphics controller, and the graphics controller may control the output of display data on a display device. The bridge/memory controller may be coupled to one or more buses. One or more of these elements may be integrated together with the processor on a single package or using multiple packages or dies. A host bus controller such as a Universal Serial Bus ("USB") host controller may be coupled to the bus(es) and a plurality of devices may be coupled to the USB. For example, user input devices such as a keyboard and mouse may be included in the computing device for providing input data. In alternate embodiments, the host bus controller may be compatible with various other interconnect standards including PCI, PCI Express, FireWire and other such current and future standards.

In the foregoing specification, the invention has been described with reference to specific exemplary embodiments thereof. It will, however, be appreciated that various modifications and changes may be made thereto without departing from the broader spirit and scope of the invention as set forth in the appended claims. The specification and drawings are, accordingly, to be regarded in an illustrative rather than a restrictive sense.

What is claimed is:

1. A method for transparently unifying virtual machines ("VMs") on a host computer, comprising:
    accepting user input into a unified desktop interface representing an interface for a unification console, the unified desktop interface including a graphical user interface to present a composite view of applications residing within the VMs on the host by displaying a plurality of application icons of application residing in a plurality of virtual machines;
    identifying an application corresponding to the input;
    identifying a VM in which the application resides;
    sending the input to the application, wherein sending the input to the application further comprises one of filtering and transforming the input;
    and causing output from the application to be redirected to the unification console, wherein causing the output from the application to be redirected to the unification console further comprises one of filtering and transforming the output.

2. The method according to claim 1 further comprising presenting the output from the application on the unified desktop interface.

3. The method according to claim 1 further comprising:
    determining whether the application is currently executing in the VM in which the application resides; and
    if not, causing the application to begin executing.

4. The method according to claim 1 wherein the unification console identifies at least one of the application and the VM in conjunction with a virtual machine manager ("VMM").

5. The method according to claim 1 wherein the unification console is executing in a VM.

6. The method according to claim 1 wherein the unification console is included in a virtual machine manager.

7. The method according to claim 1 wherein the unification console is included in a host operating system on the host.

8. The method according to claim 1 further comprising:
    enabling a descriptor module to be configured, the descriptor module including configuration information for the host;
    launching the VMs in the host according to the configuration information in the descriptor module;
    launching the unification console, the unification console capable of interacting with all the VMs according to the configuration information in the descriptor module; and
    starting up the unified desktop interface.

9. The method according to claim 8 wherein enabling the descriptor module to be configured further comprises at least one of accepting input from the user to configure the descriptor module, enabling the host to configure the descriptor module, enabling the unification console running on the host computer to configure the descriptor module and enabling the unified desktop interface to configure the descriptor module.

10. An article comprising a machine-accessible medium having stored thereon instructions that, when executed by a machine, cause the machine to:
    accept input into a unified desktop interface representing an interface for a unification console, the unified desktop interface including a graphical user interface to present a composite view of applications residing within a plurality of virtual machines ("VMs") on a host computer by displaying a plurality of application icons of application residing in the virtual machines;
    identify an application corresponding to the input;
    identify a VM in which the application resides;
    send the input to the application, wherein the input is one of filtered and transformed, and
    cause output from the application to be redirected to the unification console, wherein the output is one of filtered and transformed.

11. The article according to claim 10 further comprising instructions that, when executed by the machine, cause the machine to present the output from the application on the unified desktop interface.

12. The article according to claim 10 further comprising instructions that, when executed by the machine, cause the machine:
    determine whether the application is currently executing in the VM in which the application resides; and
    if not, cause the application to begin executing.

13. The article according to claim 10 wherein the instructions that, when executed by the machine, cause the unification console to identify at least one of the application and the VM in conjunction with a virtual machine manager ("VMM").

14. The article according to claim 10 wherein the instructions that, when executed by the machine, cause the machine to redirect the output to the unification console further comprises instructions that, when executed by a machine, cause the machine to redirect the output from the application from the VM in which the application resides to the unification console.

15. The article according to claim 14 wherein the instructions that, when executed by the machine, cause the machine to redirect the output further comprises instructions that, when executed by a machine, cause the machine to perform one of filtering and transforming the output before the output is redirected.

16. The article according to claim 14 wherein the instructions that, when executed by the machine, cause the machine to redirect the output from further comprises instructions that, when executed by a machine, cause the machine to copy the output from the application from the VM in which the application resides and provide the copy of the output to the unification console.

17. The article according to claim 16 wherein the instructions that, when executed by the machine, cause the machine to copy the output further comprises instructions that, when executed by a machine, cause the machine to perform one of filtering and transforming the output before the output is provided to the unification console.

18. The article according to claim 10 wherein the instructions that, when executed by the machine, cause the unification console to execute in a VM.

19. The article according to claim 10 wherein the instructions that, when executed by the machine, cause the unification console to be included in a virtual machine manager.

20. The method of claim 1, wherein the composite view does not identify which of the plurality of VMs hosts which of the plurality of applications.

21. The article according to claim 10, wherein the composite view does not identify which of the plurality of VMs hosts which of the plurality of applications.

22. The method of claim 1, wherein the composite view comprises a view of which of the plurality of VMs hosts which of the plurality of applications.

23. The article according to claim 10, wherein the composite view comprises a view of which of the plurality of VMs hosts which of the plurality of applications.

* * * * *